United States Patent [19]

Lawless

[11] 4,359,902
[45] Nov. 23, 1982

[54] LIQUID LEVEL GAUGE
[76] Inventor: James C. Lawless, 342-127 Quaker Church Rd., Randolph, N.J. 07869
[21] Appl. No.: 174,133
[22] Filed: Jul. 31, 1980
[51] Int. Cl.³ ............................................. G01F 23/28
[52] U.S. Cl. ..................................... 73/290 R; 343/14
[58] Field of Search ............ 73/290 R, 290 V, 304 R; 343/14, 12 R; 333/122

[56] References Cited
U.S. PATENT DOCUMENTS

| 3,424,002 | 1/1969 | Johnson | 73/290 R |
| 3,695,107 | 10/1972 | Hertz | 73/290 R |
| 4,044,353 | 8/1977 | Levy | 343/14 |
| 4,044,354 | 8/1977 | Bosher | 343/14 |
| 4,044,355 | 8/1977 | Edvardson | 343/14 |

Primary Examiner—Kyle L. Howell
Assistant Examiner—Denis E. Corr
Attorney, Agent, or Firm—Carella, Byrne, Bain & Gilfillan

[57] ABSTRACT

An apparatus and method for using microwaves to measure the level of liquid within a container comprising a waveguide for immersion into the liquid, an oscillating means for propagating a sweeping frequency electromagnetic signal down the waveguide for reflection from the surface of the liquid, impedance matched means for receiving the reflected signal and means for comparing the frequency of the reflected signal to the frequency of another output signal of the oscillating means, whereby the frequency difference corresponds to the time of travel of the signal within the waveguide and therefore the distance the signal travels before reflection.

3 Claims, 7 Drawing Figures

LINEARIZED RAMP

4,359,902

LIQUID LEVEL GAUGE

BACKGROUND OF THE INVENTION

1. Field of the Invention

This invention relates generally to apparatus for determining the amount of liquid within a container. More specifically this invention relates to devices for measuring the level of liquid within a sealed, inaccessible container.

2. Description of the Prior Art

Numerous devices exist in the prior art capable of measuring the level of liquid within a sealed, inaccessible container. Generally, the devices consist of a sensing means of some kind within the container (for example, a float) and a means for sending data from the sensing means to a remote location where it would be detected and converted into a useable format representative of the level of liquid within the container (i.e. the number of gallons therein or some other useful parameter).

There is, however, one environment where prior art liquid level gauges are inoperable. In highly radioactive, nuclear environments prior art liquid level gauges fall far short of the characteristics required for operability because of the inherent inability of electronic components of prior art gauges to function at high levels of radioactivity.

Generally, nuclear reactors such as boiling water reactors utilize liquid coolant to maintain temperature control of the nuclear reactions within the reactor. It is desirable for operating personnel to know the level of coolant within the reactor vessel to monitor cooling functions, and it is essential that the level of coolant be known in circumstances where melt-down of nuclear components (control rods, etc.) is feared in order to assess the condition of the interior of the nuclear reactor vessel. However, there is no known liquid level gauge capable of operating within a nuclear reactor to indicate the level of coolant therein. As stated above, the highly radioactive interior of the nuclear reactor vessel destroys all electronic components immediately and renders an electronic liquid level gauge totally useless. Mechanical gauges have been impractical in the nuclear environment in view of the generally compact nature of reactors—offering little room for any mechanical sensing arms or floats, etc.

Thus, there is a need for a liquid level gauge capable of measuring the level of liquid in a radioactive environment within sealed, inaccessible containers.

SUMMARY OF THE INVENTION

The disadvantages of the prior art are overcome by the present invention which includes a method and apparatus for using microwaves to measure the level of liquid within a container. The apparatus comprises an oscillating means and propagation means for transmitting a first microwave signal through a waveguide which is partially immersed within the liquid whose level is to be measured. The signal transmitted is of a variable frequency, periodically and linearly sweeping over a predetermined range of microwave frequencies. The first signal is reflected from the liquid and has a fixed frequency at any given point in time, and is compared to a different frequency second signal which is transmitted by the oscillating means at a point in time when the first reflected signal is compared to the second signal. The reflected signal is received through means which are matched in impedance to the characteristic impedance of the waveguide. Detecting means then sense the difference in frequency and the time required for the round-trip propagation of the first signal may therefore be determined. The distance travelled prior to reflection may thus be determined as well as the level of the liquid within the container.

DESCRIPTION OF THE PREFERRED EMBODIMENT

Figure 1:
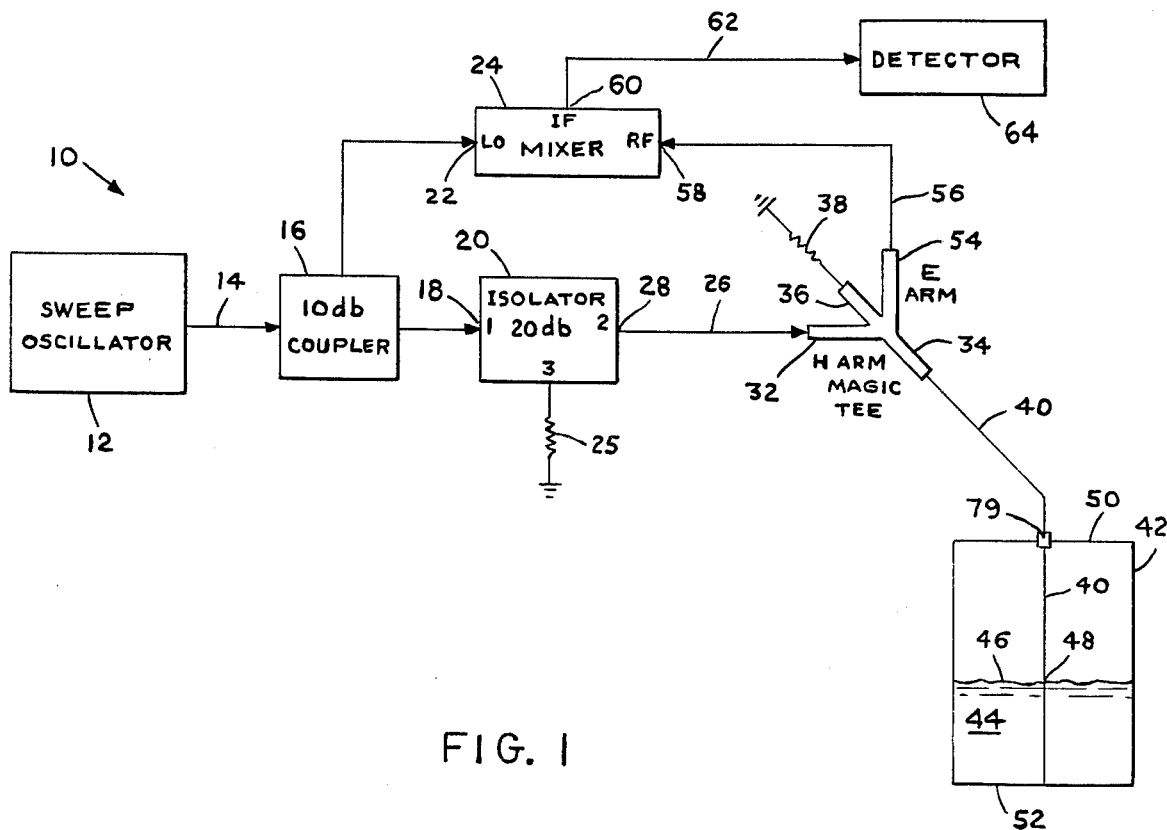
FIG. 1 is a schematic representation of a preferred embodiment of the invention diagrammatically showing the waveguide partially immersed within the liquid within a container.

Referring now to FIG. 1 there is shown a preferred embodiment of a liquid level gauge 10 constructed in accordance with the principals of this invention.

Figure 3:
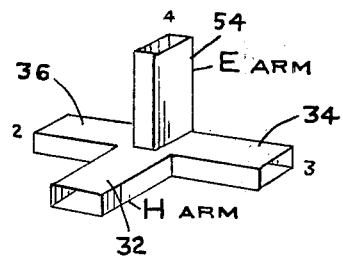
FIG. 3 is a diagrammatic perspective view of a magic tee.

Gauge 10 includes a microwave sweep oscillating means 12 for producing a sweeping frequency electromagnetic at its output and along line 14 into a 10 db coupler 16. Coupler 16 divides the microwave signal from oscillator 12 into the input 18 of 20 db circulator or isolator 20 and the LO port 22 of microwave mixer 24. The microwave signal from oscillator 12 is then transmitted along line 26 from the output 28 of isolator 20 to a magic tee 30. The magic tee 30 is a microwave component well-known to those skilled in the art and is best shown in FIG. 3.

Line 26 is connected to the H arm 32 of magic tee 30 and the collinear arms 34 and 36 are connected respectively to a termination 38 and a waveguide 40. Termination 38 must have an impedance identical to the characteristic impedance of the magic tee 30. Waveguide 40 is inserted into a container 42 having liquid 44 therein. The surface 46 of liquid 44 contacts all surfaces of waveguide 40 at a variable point 48 where the plane of surface 46 intersects and is generally perpendicular to waveguide 40. Waveguide 40 is immersed into liquid 44, extending to a predetermined point although waveguide 40 should extend from one end 50 of container 42 to the other end 52 so that the liquid level within the container may be measured over a large range.

Returning now to magic tee 30, it is shown that the E arm 54 thereof is connected via line 56 to RF port 58 of mixer 24. As will be explained below, IF port 60 of mixer 24 produces an output signal on line 62 which is detected by detecting means 64.

Figure 2:
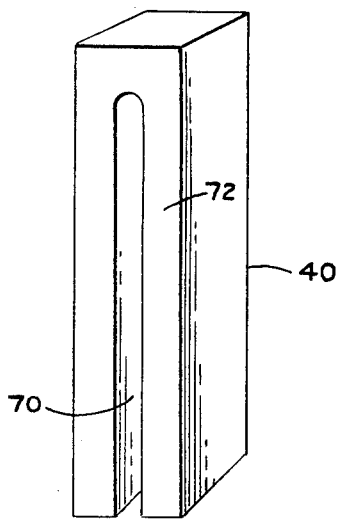
FIG. 2 is a diagrammatic representation of a form of waveguide used in the preferred embodiment of the invention.

Referring briefly to FIG. 2 there is shown therein a perspective view of waveguide 40 including a slot 70 in the broad wall 72 thereof. The function of slot 70 is to permit the liquid 44 within container 42 to rise within waveguide 40. Without slot 70 there is a possibility that the liquid would not be able to rise within the waveguide due to air pressure, although it would be able to rise on the exterior of the waveguide. Thus a false reading of liquid level would be obtained. Those skilled in the art will understand that slot 70 may be cut in broad wall 72 without radiating electromagnetic energy therefrom, thereby not interfering with the operation of the invention. Naturally, if a different type of waveguide is utilized, for example, stripline, there would obviously be no need for a slot since the liquid level would be permitted to rise around the waveguide.

Figure 4:
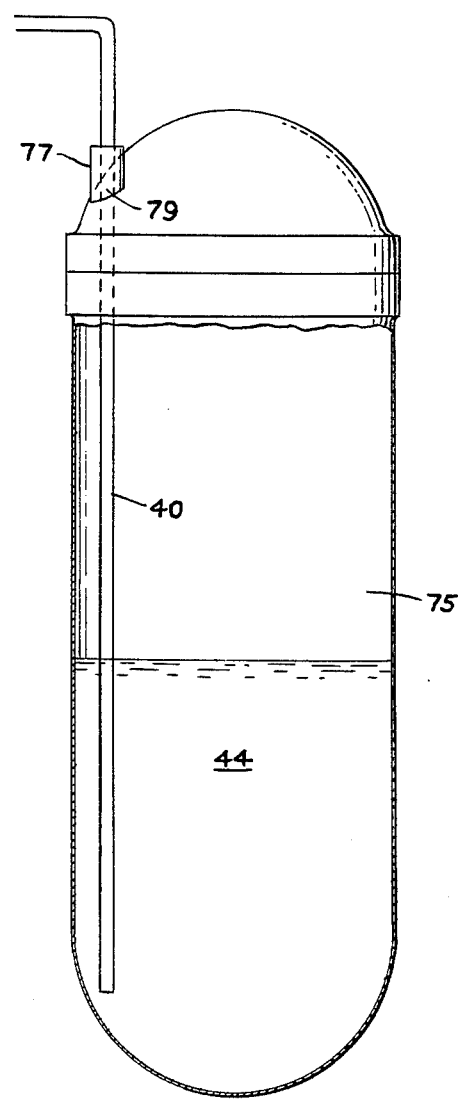
FIG. 4 is a diagrammatic cross-section elevational view of a nuclear reactor vessel in which the waveguide of the preferred embodiment may be installed.

FIG. 4 shows a schematic elevational cross section of a boiling water nuclear reactor vessel 75 (other internal components not shown) showing the placement of waveguide 40 therein. Vessel 75 may be of the order of 60 feet in height. In actual, operation, a boiling water nuclear reactor operates under tremendous atmospheric pressure within the vessel 75 and in order to maintain the pressure the point 77 at which waveguide 40 enters the vessel 75 must be sealed, for example, with a ceramic dielectric core 79.

It is noted in FIG. 4 that the waveguide 40 is the only part of the invention within or near nuclear reactor vessel 75 and accordingly, occupies very little space within the vessel. All electronic components of the invention, sweep oscillator 12, mixer 24 and detecting means 64, may be located remotely at a desireable, non-radioactive location far from the reactor because waveguide 40 may be as long as necessary to do so.

Figure 5:
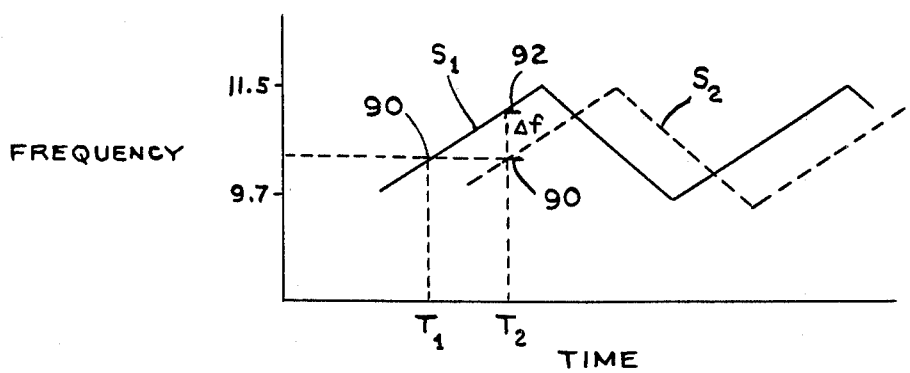
FIG. 5 is a graph of frequency v. time showing a sweeping frequency output of the oscillating means of the invention.

The output signal of sweep oscillator 12 is shown in more detail in FIG. 5 which is a graph of frequency v. time showing that the oscillator output signal $S_1$ is swept linearly and periodically over a predetermined frequency range. In the preferred embodiment disclosed herein, the frequency range chosen is 9.7 GHz to 11.5 GHz.

Those skilled in the art will understand that many other ranges of frequency may be utilized in this invention by making all components compatible with any desired frequency range. Naturally, in selecting a frequency range care must be given to determining the sensitivity of any particular frequency to various conditions within the container. Thus, if steam is expected within the container in addition to liquid then one would select a frequency near 24 GHz if the position of steam within the container was desired—this frequency would tend not to penetrate the steam and would reflect therefrom. However, if the liquid level is desired rather than steam, one would select a different frequency range so as to penetrate the steam.

Signal $S_2$ as shown on FIG. 5 is the signal output of sweep oscillator 12 at a point in time different from the time at which signal $S_1$ was generated. This will be more apparent from the detailed discussion of the operation of the invention below.

Referring now again to FIGS. 1 and 5 it is noted that at an arbitrary point in time $T_1$ the output of sweep oscillator 12 will be a particular first frequency signal schematically represented as point 90 on FIG. 5. Since all components between sweep oscillator 12 and magic tee 30 are in very close proximity to each other at a remote location away from nuclear reactor vessel 75, and since electromagnetic microwave signals travel at the speed of light it may easily be assumed that the first signal being transmitted from collinear arm 34 of magic tee 30 at time $T_1$ is the same frequency 90. From collinear arm 34 the first microwave signal having frequency 90 will be propogated through waveguide 40 until it is reflected from the surface of liquid 44 at point 48 within the waveguide. As is well-known to those skilled in the art, the liquid within the waveguide will act as a short circuit and reflect the incident microwave signal back to collinear arm 34.

As is well-known, upon injection of a microwave signal into collinear arm 34 it will divide equally between H arm 32 and E arm 54 and none of the signal will propagate into other collinear arm 36. The short circuit at the reflection end of the waveguide necessitates a matched impedance at the other end (looking back to the electronic components) in order to eliminate ringing in the waveguide by properly terminating the waveguide. Those skilled in the art will understand that if a waveguide is terminated at each end by a short circuit it will behave as a microwave cavity. Any signal injected into such a cavity will bounce back & forth until dissipated by losses. Without proper termination this ringing signal will initially be much greater than the desired signal. Because of the termination on arm 36 there will be no misleading reflections and the signal in E arm 54 will be the result of an efficient power transfer between arm 34 and E arm 54. The portion of signal propagated through H arm 32 is not needed and is therefore terminated in termination 25 connected to port 3 of isolator 20. Those skilled in the art will understand that other microwave components have properties similar to the magic tee and may be utilized in its place. The signal reflected from the surface will then be transmitted to RF port 58 wherein it will be mixed at a time $T_2$ with the signal existing at that time at LO port 22.

Because of the fact that a certain transmission time is required to propagate the first microwave signal from arm 34 to the surface of the liquid and return to arm 34, the reflected signal will arrive at arm 34 at time $T_2$ which (because of the proximity of the magic tee to the mixer) is the same time at which the signal arrives at RF port 58. Those skilled in the art will understand that because sweep oscillator 12 is continually sweeping the frequency output, at the time $T_2$ the output of sweep oscillator 12 which will occur at LO port 22 will be a different frequency than the first signal which was transmitted at time $T_1$ and which has the same frequency as the reflected signal which arrived at the RF port at time $T_2$. Thus, mixer 24 has two different frequency signals at the LO and RF ports and the IF port output will be a differential frequency output which, as shown below can be detected by detecting means 64 and converted into a distance parameter.

By reference to FIG. 5 it will be noted that at time $T_2$ the output $S_1$ of sweep oscillator 12 has a frequency 92 while the frequency that was transmitted from sweep oscillator 12 at time $T_1$ is frequency 90. By reference to the point 90 drawn on the $T_2$ line on the graph it is noted that there is a frequency differential as mentioned above. Plotting the locus of points similar to 90 at each point in time will produce a signal $S_2$ displaced from $S_1$ by the aforementioned differential frequency. The signal $S_1$ represents the oscillator output signal (at LO port 22) that is mixed with the reflected signal in mixer 24 and the signal $S_2$ represents the reflected signal (at RF port 58).

Since the oscillator is swept at a predetermined and periodic rate the change in output frequency per unit of time is known and, since the microwave signal travels at the speed of light the differential frequency per unit of length can be determined as follows for the preferred embodiment disclosed herein:

$$\frac{\Delta f}{T} = \frac{(11.5 - 9.7) \times 10^9}{14 \times 10^{-3}} = 128 \times 10^9 \text{ Hz/sec.}$$

$$\frac{\Delta f}{T} = \frac{128 \times 10^9 \text{ Hz/sec.}}{1 \text{ft}/10^{-9} \text{ sec.}} = 128 \text{ Hz/ft.}$$

Since distance traveled is double the one way trip, the differential frequency detected will represent one-half the one-way distance. Thus, a differential frequency of 256 Hz will represent a one-way distance of one foot within the waveguide.

Figure 6:
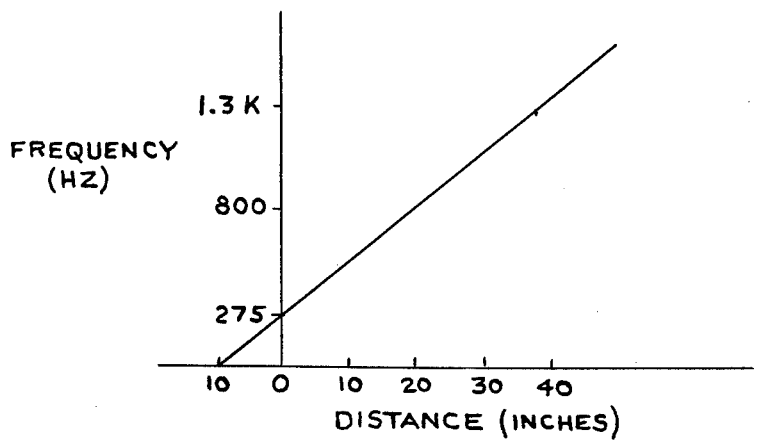
FIG. 6 is a graph of frequency v. distance showing a relationship between these two parameters.

The above relationship between frequency and length is graphically demonstrated in FIG. 6 which is the type of function that would be performed by detecting at means 64. That is, a differential frequency input into detecting means 64 would be processed by well known circuitry therein (not shown) to produce an output reading equivalent to the distance that the electromagnetic signal traveled within waveguide 40. Detecting means 64 may, for example, be a spectrum analyzer, where the detected frequency could be read off a scale of distance or length or a frequency counter which could provide an output equivalent to distance or length.

While waveguide 40 will in practice be rather long to enable the remote location of the electronics of the invention, the distance between the magic tee 30 and the point of insertion of the waveguide into the reactor vessel 75 can obviously be measured and known. This measurement can constitute an offset to the distance indicated in FIG. 6 so that the net output of detecting means 64 would be a direct reading of the distance within the reactor vessel itself that the electromagnetic signal had to travel prior to reflection from the surface of the liquid. Obviously, if one wanted to determine the distance of the surface of the liquid from the bottom of the reactor vessel one would merely have to provide a further offset in detecting means 64 to effectively subtract the distance the signal travels within reactor vessel 75 from the distance between the point of entry (of waveguide 40 into vessel 75) from the bottom of the vessel.

Figure 7:
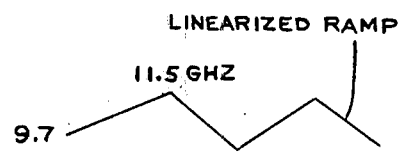
FIG. 7 is a schematic representation of a portion of an alternate embodiment of the invention.
Figure 7:
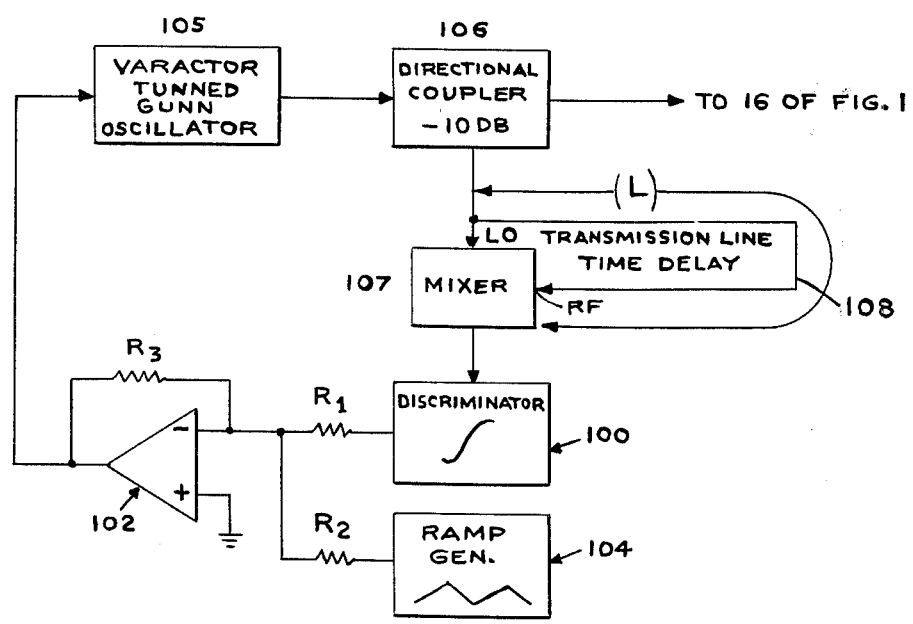

FIG. 7 shows a schematic representation of another embodiment of a portion of the invention. The circuit of FIG. 7 is intended to improve the resolution of the invention by controlling the linearity of the sweeping frequency output.

Those skilled in the art will understand that the precision with which the microwave output is swept through a predetermined frequency range affects the accuracy of the parameter Δf/ft. Thus, for example, if linearity is accurate to within 1% of the swept frequency range, the resolution of the invention will be 1%. That is, for a distance of travel within the waveguide of 100 ft. the invention will detect a liquid level at a given number ±1 ft.

The circuit of FIG. 7 essentially may replace the sweep oscillator 12 of FIG. 1 and linearizes the sweeping frequency signal in the following manner. The ramp generator 104 output passes thru amplifier 102 and is applied to the varactor input of the gunn oscillator 105. The output of the gunn oscillator is a reasonably linear sweeping frequency. This output is sampled by the directional coupler (106) and is applied to the LO port of mixer (107). A transmission line 108 of length (l) connects the LO port to the RF port. Since the input signal is sweeping a differential signal will be presentl at the IF port as explained above with respect to FIG. 5. The output from the IF port is connected to the input of the discriminator (100) where the frequency is converted to a DC voltage proportional to frequency. If the output from mixer 107 is a single frequency (that is if there is a perfectly linear sweeping frequency at the LO port) the output from the discriminator does not vary. Thus the ramp generator output controls the gunn oscillator. If however the output of the mixer is a varying frequency the discriminator will output a signal proportional to this varying frequency. This discriminator output is combined with the ramp generator output in amplifier (102) to minimize the deparature from perfect linear sweeping. Resistors $R_1$, $R_2$ and $R_3$ control the degree of correction.

The invention disclosed herein is, in addition to nuclear environments, well adapted for use in other environments such as petroleum cracking towers, highly caustic or corrosive areas, etc.

Those skilled in the art will realize that the numerous other modifications and improvements of the embodiment of the invention disclosed herein may be made without departing from the spirit and the scope thereof.

What is claimed is:

1. A liquid level gauge for measuring the level of liquid within a container comprising:
    a waveguide for partial immersion into said liquid, said waveguide having a first end distal from said liquid and a second end adjacent thereto;
    means for producing a signal for propagation in said waveguide from said first end, said signal being a periodically sweeping frequency electromagnetic signal sweeping at a predetermined rate over a predetermined frequency range said signal being a first signal having a first frequency at time $T_1$ and a second frequency at time $T_2$;
    a microwave mixer having an RF port, an LO port and an IF port the operating frequency of said mixer being compatible with the output frequency range of said producing means;
    an isolator having an input and an output;
    a coupler for receiving said first signal from said producing means and for transmitting said first signal to said isolator input and to said LO port;
    a termination having a predetermined impedance;
    a magic tee having an H arm, an E arm and two collinear arms, said H arm operatively connected to said isolator output, said E arm operatively connected to said RF port, one of said collinear arms operatively connected to said termination wherein said predetermined impedance is an impedance equal to the characteristic impedance of said waveguide, the other of said collinear arms operatively connected to said first end of said waveguide;
    detection means for detecting the output of said IF port and for converting same to a unit of distance; and,
    upon transmission of said first signal having a first frequency at a time $T_1$ through said coupler and isolator, and through said H arm, said first signal having a first frequency will be transmitted into said first end of said waveguide and, upon reflection of said first signal from said liquid, said reflected signal having said first frequency will be transmitted to said RF port and, upon detection by said mixer at a time $T_2$ of the signals at said LO and RF ports at a time $T_2$, said IF port output signal will be corresponding to the difference in frequency between said reflected signal having said first frequency and said second signal and upon detection of IF port output by said detection means the output thereof will correspond to the distance travelled by said first signal prior to reflection and therefore said level of liquid within said container.

2. An apparatus according to claim 1 wherein said periodically sweeping frequency eletromagnetic signal is sweeping linearly within said predetermined frequency range.

3. An apparatus according to claim 1 or 2 wherein said detection means is a spectrum analyzer.

* * * * *